(12) United States Patent
Horsch

(10) Patent No.: US 9,278,594 B2
(45) Date of Patent: Mar. 8, 2016

(54) INDEPENDENT WHEEL SUSPENSION FOR A SPRING-MOUNTED STEERABLE WHEEL

(75) Inventor: Michael Horsch, Schwandorf (DE)

(73) Assignee: Horsch Maschinen GMBH, Schwandorf (DE)

( * ) Notice: Subject to any disclaimer, the term of this patent is extended or adjusted under 35 U.S.C. 154(b) by 0 days.

(21) Appl. No.: 13/700,469

(22) PCT Filed: May 30, 2011

(86) PCT No.: PCT/EP2011/058848
§ 371 (c)(1),
(2), (4) Date: Nov. 28, 2012

(87) PCT Pub. No.: WO2011/151292
PCT Pub. Date: Dec. 8, 2011

(65) Prior Publication Data
US 2013/0069336 A1    Mar. 21, 2013

(30) Foreign Application Priority Data

Jun. 1, 2010 (DE) .......................... 10 2010 022 313

(51) Int. Cl.
*B60G 3/01* (2006.01)
*B62D 7/06* (2006.01)

(52) U.S. Cl.
CPC .. *B60G 3/01* (2013.01); *B62D 7/06* (2013.01); *B60G 2200/10* (2013.01); *B60G 2204/4232* (2013.01); *B60G 2300/08* (2013.01); *B60Y 2200/22* (2013.01)

(58) Field of Classification Search
CPC .. B60G 3/01; B60G 2200/22; B60G 2200/24; B60G 2204/421; B60G 2204/4232; B60G 2300/08; B60B 35/008; B62D 7/06; B60Y 2200/22

USPC .............. 180/8.3, 8.5, 900; 280/6.154, 6.155, 280/6.157
See application file for complete search history.

(56) References Cited

U.S. PATENT DOCUMENTS

| | | | | |
|---|---|---|---|---|
| 1,984,694 | A * | 12/1934 | Nottoli | 267/68 |
| 2,299,241 | A * | 10/1942 | Kumm | 280/124.127 |
| 4,241,803 | A * | 12/1980 | Lauber | 180/8.1 |
| 4,534,575 | A * | 8/1985 | Grove et al. | 280/124.136 |
| 5,580,089 | A * | 12/1996 | Kolka | 280/124.103 |
| 6,036,201 | A * | 3/2000 | Pond et al. | 280/5.514 |
| 6,199,769 | B1 | 3/2001 | Weddle | |
| 6,311,795 | B1 * | 11/2001 | Skotnikov et al. | 180/8.3 |
| 6,491,306 | B2 * | 12/2002 | Schaffer | 280/5.502 |
| 6,845,830 | B2 * | 1/2005 | Tojo et al. | 180/8.3 |
| 7,168,717 | B2 * | 1/2007 | Wubben et al. | 280/124.127 |
| 7,284,764 | B2 * | 10/2007 | Prohaska | 280/124.127 |

(Continued)

FOREIGN PATENT DOCUMENTS

| EP | 1685988 | | 11/2009 |
|---|---|---|---|
| EP | 1685988 | B1 | 11/2009 |

*Primary Examiner* — Paul N Dickson
*Assistant Examiner* — Timothy Wilhelm
(74) *Attorney, Agent, or Firm* — Yancy IP Law, PLLC (57) ABSTRACT

Disclosed is an independent wheel suspension (1) for a steerable wheel (37) having a motor (3). The motor is connected via a linear guide (5), which is movable in an approximately vertical direction (A), to a revolute joint (7) which produces a steering connection, pivotable about an at least approximately vertically running axis of rotation (B), to a vehicle frame (39). The linear guide (5) is coupled to a fluidic spring and/or damping element (9) which forms a load-bearing constituent part of the revolute joint (7).

7 Claims, 5 Drawing Sheets

(56) References Cited

U.S. PATENT DOCUMENTS

| | | | |
|---|---|---|---|
| 7,574,926 B2 * | 8/2009 | Anderson | 73/862.325 |
| 7,837,207 B2 * | 11/2010 | Kremmin et al. | 280/43.22 |
| 8,042,817 B2 * | 10/2011 | Motebennur et al. | 280/5.514 |
| 8,205,893 B2 * | 6/2012 | Peterson et al. | 280/6.157 |
| 8,376,078 B2 * | 2/2013 | Hiddema | 180/209 |
| 8,424,881 B2 * | 4/2013 | Vander Zaag et al. | 280/6.157 |
| 8,534,686 B1 * | 9/2013 | Slawson | 280/124.145 |
| 2002/0053795 A1 | 5/2002 | Schaffer | |
| 2002/0109400 A1 | 8/2002 | Huth | |
| 2006/0150606 A1 | 7/2006 | Anderson | |

* cited by examiner

INDEPENDENT WHEEL SUSPENSION FOR A SPRING-MOUNTED STEERABLE WHEEL

The present invention relates to an independent wheel suspension for a steerable wheel of a vehicle with the characteristics of the independent claim 1.

Traditional agricultural vehicles are normally equipped with simple and robust rigid axles, wherein the front axles are usually designed with a pendulum joint to improve the cross-country mobility, while rear axles are often provided without any spring suspension for reasons of traction optimization. However, the equipment of vehicles with spring suspension systems makes sense in a number of individual cases, including for reasons of protecting the ground. For example, independent wheel suspensions for agricultural vehicles have been disclosed in the prior art, which have the advantage compared to rigid axles that the spring suspension is not mutually influenced on both sides of the vehicle. Disclosed independent wheel suspensions include for example the McPherson strut unit, the oscillating crank or multi-link suspensions.

Said type of independent wheel suspension in which a wheel is spring-mounted by way of an oscillating arm arranged on a hydraulic cylinder such that a linear motion of the wheel is converted into a moment is disclosed in DE 8404619 U1. Additional resources are required for this purpose, which may incur additional costs and increase the space requirement. Moreover, steering or driving the wheel is impossible.

Furthermore, an axle suspension of an agricultural vehicle is disclosed in DE 196 39 777 A1, in which a steerable wheel is equipped with pneumatic damping. This creates a wheel suspension in which vertical spring motions of a leading axle are spring-suspended and/or damped.

A spring suspension system for an agricultural vehicle having steerable independent wheel suspensions is described in EP 1 685 988 B. A crankcase of a wheel hub motor or similar is arranged on a support tube revolving around a vertical axis. An upper end of the support tube which is revolving for the purpose of steering is coupled with an air bellows such that the entire wheel suspension is provided with a limited range of spring.

One main goal of the invention is to provide an improved independent wheel suspension of a steerable and/or driven wheel having a spring suspension system. Said independent wheel suspension should be as stable as possible, provide large ranges of spring, be coupleable with a simply functioning damping system and have a design that is as compact as possible.

Said goal of the invention is achieved with the object of the independent patent claim 1. Characteristics of advantageous upgrades of the invention can be derived from the dependent claims. For instance, the present invention proposes an independent wheel suspension for a steerable wheel of a vehicle, in particular an agricultural towing, transport or specialty vehicle in which a steering column cooperates with a linear guide movable in an approximately vertical direction by way of a revolute joint. In so doing, the revolute joint creates a steering connection to a vehicle frame pivotable around an at least approximately vertically running axis of rotation. Furthermore, the linear guide is coupled to a fluidic spring and/or damping element which forms a load-bearing component of the revolute joint. For instance, preferably at least parts of the fluidic spring and/or damping element can project into or be integrated in the steering column. In addition, the fluidic spring and/or damping element can be arranged in the steering column as an integrated component, wherein the steering column can be designed for example as a cylinder or lifting cylinder for the fluidic spring and/or damping element.

The special advantage of said arrangement having a spring and/or damping system integrated in the steering column is in the large ranges of spring which can be realized in this fashion as needed. Moreover, the limitations with respect to the range of spring as well as the possibility of coupling with effective damping elements such as they exist in air bellows systems disclosed in the prior art are eliminated. While traditionally-used air bellows provide a very limited range of spring and are nevertheless relatively voluminous on the one hand and have to be combined with additional damping elements on the other hand, if wheel damping should be possible as well, the wheel suspension according to the invention offers the possibility to realize very large ranges of spring with the smallest possible installation space required by way of partial or complete integratability of the spring systems into a steering column.

Furthermore, a preferred variant of the independent wheel suspension according to the invention can provide that the linear guide is equipped with a drive motor for driving the steerable wheel. This way, both wheels can optionally be provided with an axis having hydrostatic or electrical wheel hub motors or similar. Optionally, all wheels of a vehicle can be equipped with said drive motors on the suspensions. The particularly compact design and the realizable long ranges of spring can contribute to the realization of a very high ground clearance of the vehicle, which can be very advantageous for example to conduct maintenance operations with a relatively high plant cover or for use in special cultures.

The steerability of the axles can for example be realized with corresponding steering arms and swivels which optionally engage on the steering column of every wheel suspension or on other suspension parts. The required steering forces can be achieved by way of linking the lever above the steering knuckle or the traditional way by means of linking directly on the steering knuckles. In one variant of the independent wheel suspension according to the invention, the steering column itself can optionally be designed to transmit a torque to the revolute joint.

The linear guide can for example be formed with a slide or similar, wherein the slide and the revolute joint coupled with the steering column each comprise at least one guiding element through which at least one guide rod runs, such that the slide and the revolute joint are movable in a linear direction relative to each other. Said suspension achieves the required stability, because the slide guide can be designed such that the guide rods or the at least one guide rod is encompassed across an adequate length, thus creating favorable leverage ratios. For instance, the steering column can join a fork crown or similar at its underside, with two guide bars or rods pointing downward parallel to the steering column anchored on the fork crown, said guide bars or rods in turn retaining the slide moveable parallel to the steering column and along the guide bars and guiding it in a longitudinal direction, said slide retaining and supporting the complete edge connection including the wheel hub motor.

An alternative embodiment variant of the independent wheel suspension according to the invention can provide that the cylinder or the spring and/or damping element coupled with or at least partly integrated in the steering column comprises an air bellows having a spring-mounted connection with the prop of the slide. Said air bellows can be arranged for example as an additional spring element between a fork crown or a lower limit stop element of the steering column and a load-bearing element of the movable slide and be designed optionally as a spring-mounted element and/or as a limit stop buffer to limit the maximum range of spring deflection or similar.

Furthermore, the spring and/or damping element can comprise one or a plurality of pressure reservoirs with connections, wherein the pressure reservoirs preferably have a fluidic connection with the cylinder and the spring and/or damping element of the steering column by way of line systems. Based on the compact design of the entire wheel suspension, these pressure reservoirs or the at least one pressure reservoir can be designed as small tanks anchored on the slide together with the wheel hub motor and thus be placed in the wheel disc of the vehicle's wheel anchored on the wheel hub motor without affecting or interfering with the ground clearance or the ease of movement between the axles in any way.

Finally, the invention comprises an agricultural utility vehicle having at least one independent wheel suspension according to one of the embodiment variants described above, a vehicle frame, with the at least one, but typically at least two independent wheel suspensions arranged on it. The agricultural utility vehicle can be designed for example as a towing vehicle and comprise at least one or a plurality of ground treatment devices attached on the vehicle frame. However, the utility vehicle can also be designed as multi-purpose or combination vehicle or as specialty vehicle and comprise a semi-mounted device or similar with an insecticide spray tank or other agricultural functional components.

The purpose of the independent wheel suspension according to the invention is to provide the spring-mounted and/or damped wheel guidance for a steerable wheel. The independent wheel suspension can be provided for example for single, double or multi-tracked utility vehicles. If a plurality of independent wheel suspensions included in the claims according to the invention is provided for a utility vehicle, the rotating motion of one or a plurality of independent wheel suspensions can be simultaneous or in succession and homogeneous or inhomogeneous with respect to the rotating motion. According to the invention, a motor can be provided for driving the wheel. The motor can be arranged on the linear guide and drive the steerable wheel. A broad range for the selected performance of the used motor is available to the person skilled at the art, allowing him to select the optimized performance with respect to the intended purpose of the independent wheel suspension included in the claims. The motor can be designed for example as a wheel hub motor, as a transmission with an oil motor or as an electrical drive unit. The motor is connected with a revolute joint by way of a linear guide movable in an approximately vertical direction. The linear guide can be designed for example as a rail guide. Depending on the selected embodiment, the hinged connection can also comprise at least one ball bearing or similar components. The revolute joint creates a steering connection to a vehicle frame pivotable around a vertical axis of rotation. Moreover, the linear guide is coupled with a fluidic spring and/or damping element. The fluidic spring and/or damping element can be for example a hydraulic and/or pneumatic spring system. The spring and/or damping element forms a load-bearing component of the revolute joint. In the process, the revolute joint can comprise one or a plurality of components of the spring and/or damping element. For example, a steering column arranged on the revolute joint can be provided. In connection with the desired rotating motion of the independent wheel suspension, a torque can be transmitted from the steering column to the revolute joint. The steering column can be designed such that it additionally acts as a cylinder of a spring and/or damping element.

In a preferred embodiment of the present invention, the motor can be arranged on a slide. For example, the motor can be arranged on the slide by means of threaded and/or clamped connections and/or different additional fastening elements. The slide can comprise a linear guide element with a guide rod running through it. The linear guide element can for example be designed as a bore hole or as a guide channel. In this embodiment, the selected diameter of the guide element of the revolute joint can deviate from the selected diameter of the guide element of the slide. The selected diameter of the guide element of the revolute joint can for example be selected such that it is designed as interference fit for the guide rod such that the guide rod is rigidly arranged in the guide element of the revolute joint. This can allow the slide and the revolute joint to be movable relative to each other in a linear direction. In a preferred embodiment, the relative motion is such that the revolute joint adopts a fixed position and a linear motion of the slide takes place toward or away from the revolute joint. In another embodiment of the present invention, the cylinder comprises an air bellows having a spring-mounted connection with a prop of the slide. The air bellows is preferably made of flexible material. The prop can be formed for example by a flat surface which the air bellows can be placed upon. Furthermore, the damping element can comprise one or a plurality of pressure reservoirs with connections. The pressure reservoirs can have a fluidic connection with the cylinder by way of line systems. In a selected embodiment, the pressure reservoirs can be designed as a pneumatic and/or hydraulic cylinder. The spring action of the spring and/or damping element can be influenced and optimized by increasing the pressure of the presser reservoirs which is achieved for example via the connections.

Based on experience, the independent wheel suspension included in the claims according to the invention is for example suitable for use in agricultural utility vehicles, because different ground gradients occur here, which can be cushioned or damped optimally with the independent wheel suspension included in the claims. Furthermore, a ground treatment device can be attached on an agricultural utility vehicle, wherein the independent wheel suspension is designed such that it is able to carry the additional load without being damaged and the damping or cushioning is ensured even with the additional load. The ground treatment device can for example be a spray rod assembly. Aside from the latter, other ground treatment devices such as for examples ploughs or similar machines are also possible.

The invention and its advantages are explained in more detail below based on the exemplary embodiments and the enclosed figures. Other characteristics, purposes and advantages of the present invention can be derived from the detailed description of a preferred embodiment of the invention below, which serves as a non-limiting example and makes reference to the enclosed drawings.

Identical reference numbers are used for the same elements or elements with the same effect. Furthermore, for the sake of clarity, only the reference numbers required for the description of the respective figure are illustrated in the individual figures. The illustrated embodiments only represent examples indicating how the device according to the invention can be designed and do not represent a conclusive limitation.

Figure 1:
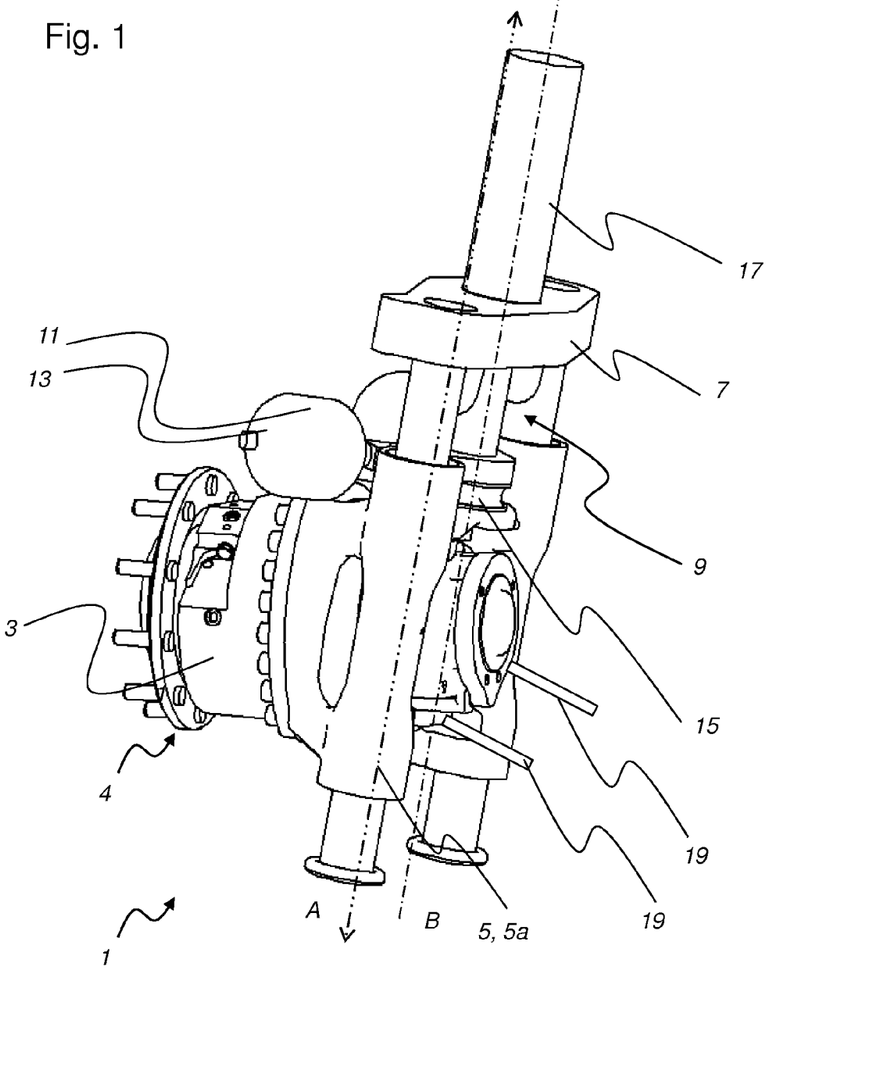
FIG. 1 shows a first perspective representation of an embodiment of an independent wheel suspension according to the invention.
Figure 2:
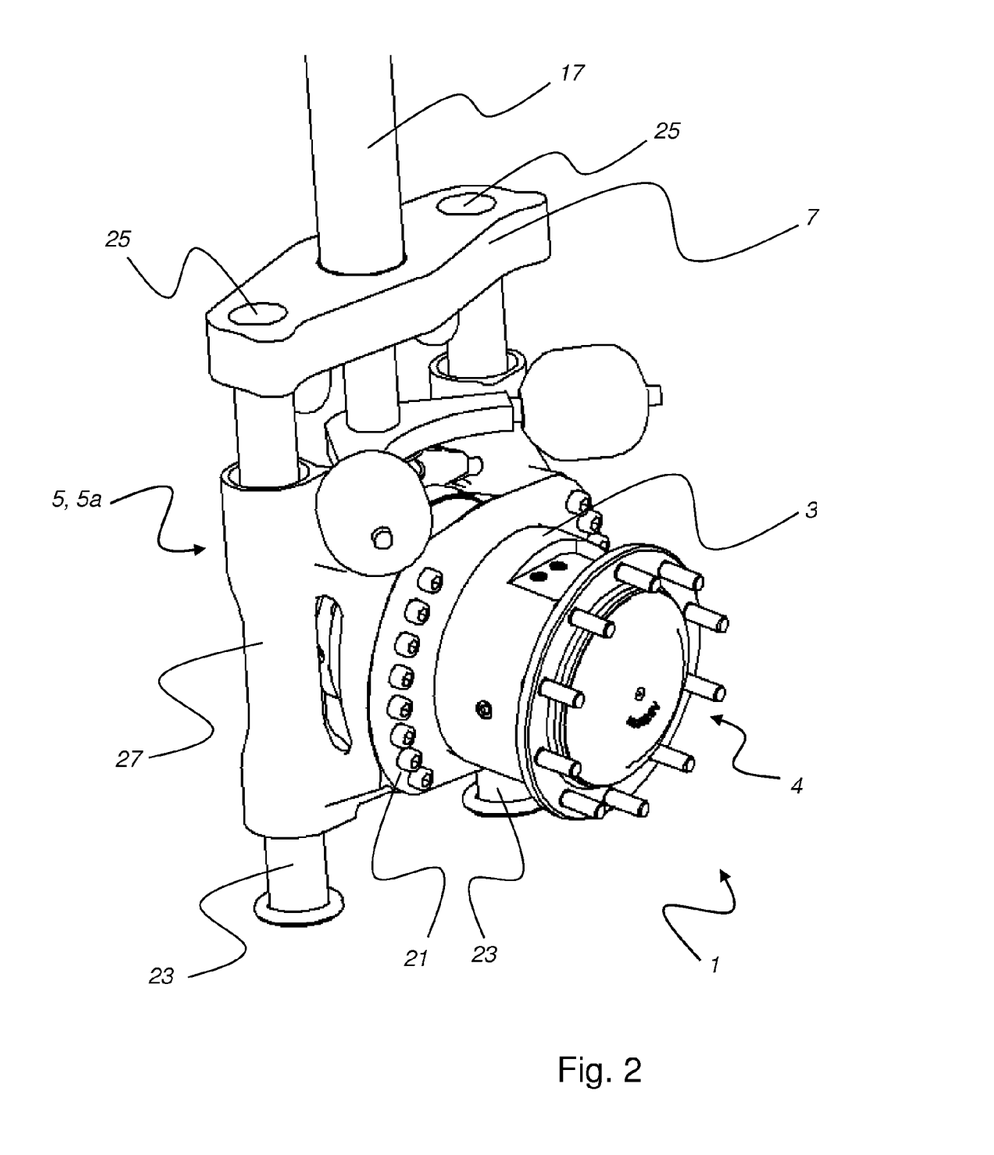
FIG. 2 shows an additional perspective representation of the independent wheel suspension according to FIG. 1.
Figure 5:
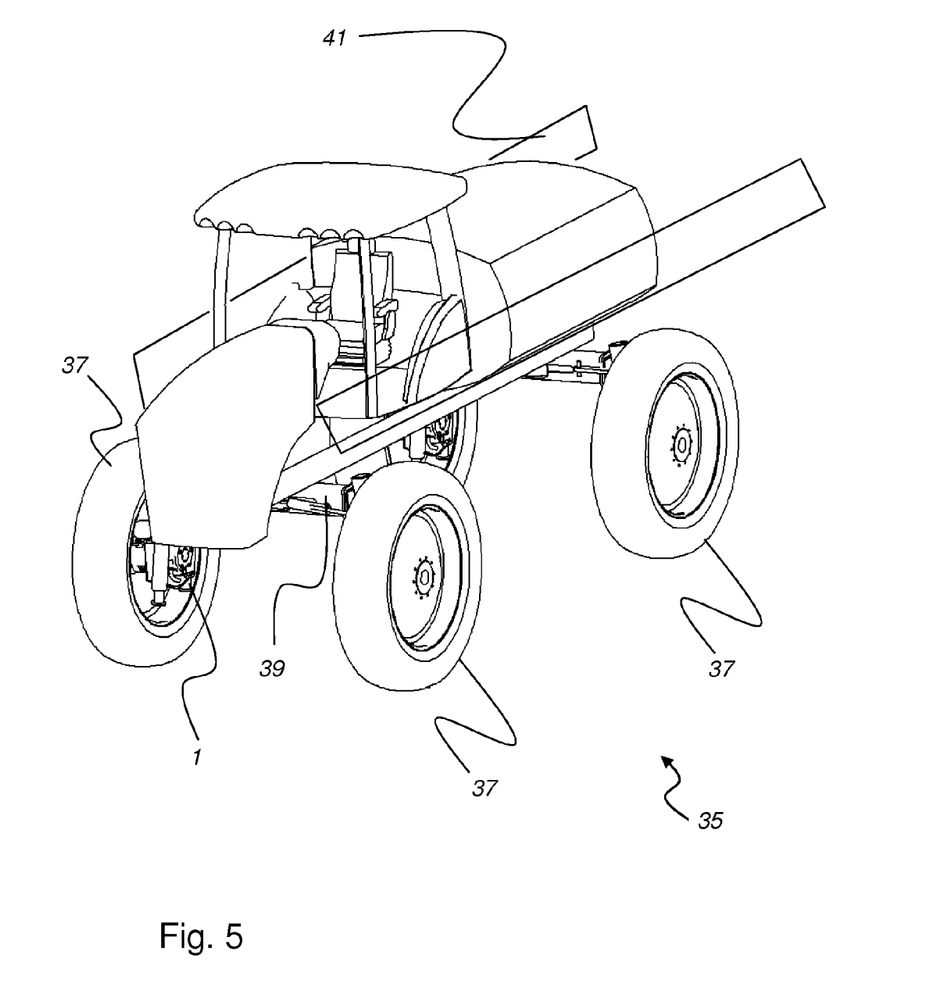
FIG. 5 shows a perspective diagram of an embodiment variant of an agricultural utility vehicle with independent wheel suspensions.

The schematic perspective representations of FIG. 1 and FIG. 2 illustrate different views of an embodiment variant of an independent wheel suspension 1 according to the invention, such as it can be used for example in agricultural utility vehicles (cp. FIG. 5). The independent wheel suspension 1 includes a wheel hub motor 3 as drive which comprises a wheel joining flange 4 for a driven wheel of the vehicle. Within the scope of the present invention, embodiments of independent wheel suspensions 1 can also be provided which do not comprise a motor 3. The wheel hub motor 3 is connected with a revolute joint 7 by way of a linear guide 5 movable in an approximately vertical direction A. The revolute joint 7 designed as a fork crown connected with an underside of the steering column 17 shown in the illustrated exemplary embodiment creates a steering connection to a vehicle frame (not illustrated), pivotable around an at least approximately vertical running axis of rotation B. Optionally, the steering connection to the vehicle frame can also be linked to the linear guide 5.

The linear guide 5 designed as a vertically movable slide is coupled with a fluidic spring and/or damping element 9. Here, the damping element 9 comprises a damping cylinder. In the illustrated embodiment, the damping cylinder is at the same time designed as and integrated in the steering column 17 and it can initiate a rotating motion of the revolute joint 7 by transmitting a torque. Moreover, the damping element 9 can comprise an air bellows 15 which has at least superficial contact with the linear guide 5 or can also be connected with it. In the illustrated embodiment, the linear guide 5 is designed as a slide 5a. As shown in the illustrated embodiment, the damping element 9 can comprise one or a plurality of pressure equalization reservoirs 11. The pressure in the pressure equalization reservoirs 11 can be changed by means of the connections 13 and the spring effect of the damping element 9 can be influenced in this fashion. In the illustrated exemplary embodiment, the wheel hub motor 3 is designed as a hydraulic or hydrostatic drive and therefore comprises hydraulic connections 19.

Figure 4:
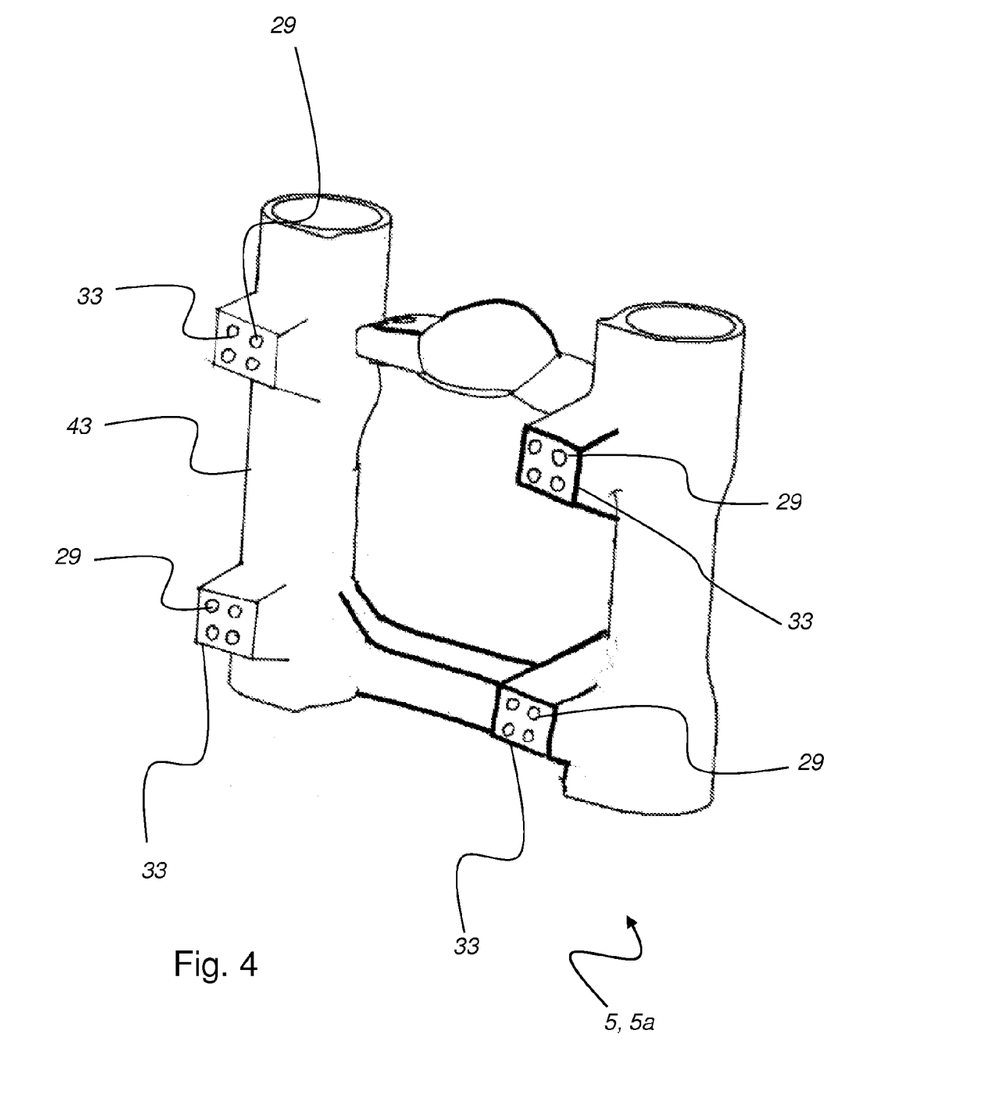
FIG. 4 shows an additional perspective representation of a slide according to FIG. 3.

The perspective representation of FIG. 2 shows a second view of the independent wheel suspension 1 according to FIG. 1. The wheel hub motor 3 is arranged on a slide 5a. The guide element 25 of the revolute joint 7 is designed as bore hole in the illustrated embodiment, with a guide rod 23 fastened in it by means of interference fit. Moreover, the guide rod 23 runs through a guide element 27 of the linear guide 5 or is encompassed by the latter. Here, the guide element 27 is designed as a guide channel. Consequently, the linear guide 5, designed as slide 5a in the illustrated embodiment, and the revolute joint 7 are movable relative to each other in a linear direction. The wheel hub motor 3 is fastened on the linear guide 5 or the slide 5a by means of a fastening element 21. The fixation can be achieved for example by means of threaded and/or plug-in connections engaging in the recesses 29 (not illustrated, cp. FIG. 4) and/or screw threads of the linear guide 5.

Figure 3:
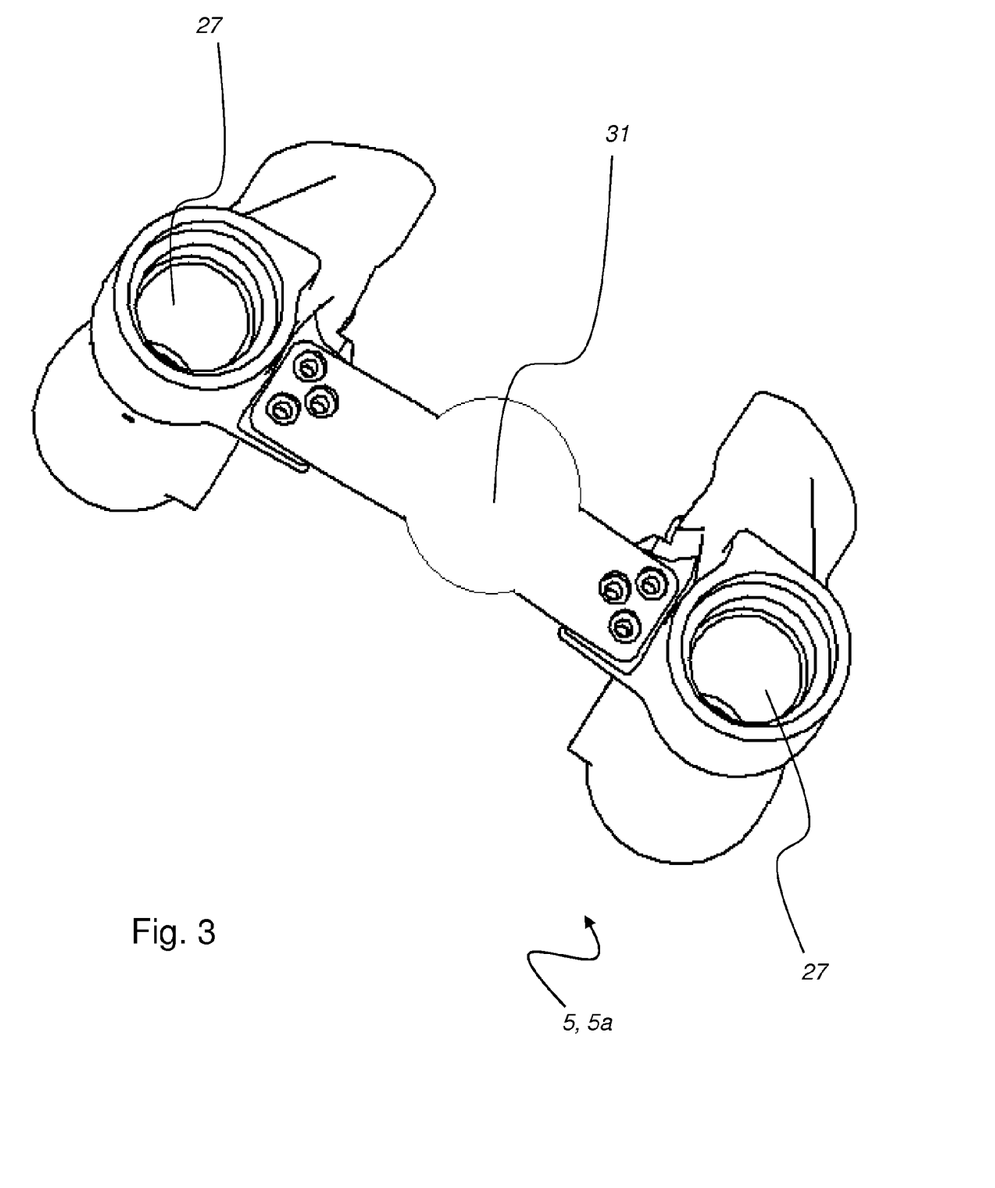
FIG. 3 shows a perspective representation of a movable slide of the independent wheel suspension.

FIG. 3 shows a perspective representation of the slide 5a. Said slide 5a comprises guide elements 27 designed as hollow channels in the illustrated embodiment. As illustrated in FIG. 1, the slide 5a is in superficial contact with one or a plurality of components of the spring and/or damping element 9 by way of a prop 31. As shown in the embodiment illustrated in FIG. 1, this can for example be an air bellows 15.

FIG. 4 shows another perspective representation of the slide 5a. The slide 5a comprises fastening surfaces 33 for a fastening element 21 (not illustrated, see FIG. 2 for this purpose). The fastening surfaces 33 are provided with recesses 29 which can comprise for example screw threads for fastening the fastening element 21 by means of threaded joints. The slide 5a can comprise a taper 43 in pre-defined areas.

The perspective representation of FIG. 5 shows an embodiment of a utility vehicle 35 with independent wheel suspensions 1. A wheel 37 each is arranged on one independent wheel suspension 1. The independent wheel suspensions are attached in a frame 39. A ground treatment device, in the present case a spray rod assembly 41, is additionally arranged on the frame 39.

The special advantage of said arrangement with the spring suspension and/or damping 9 at least partially integrated in the steering column 17 is in the very large ranges of spring which can be realized as needed with the relatively long steering column 17 which is not subject to any length restrictions. Furthermore, the limitations with respect to the range of spring as well as the possibility of coupling with effective damping elements such as they exist in air bellows known from the prior art do not apply. While the traditionally used air bellows offer a very limited range of spring and are nevertheless relatively voluminous on the one hand and have to be combined with additional damping elements on the other hand, if wheel damping should be possible as well, the wheel suspension 1 according to the invention offers the possibility to realize very large ranges of spring with the smallest possible installation space required by way of partial or complete integratability of the spring systems 9 into a steering column 17.

The invention was described with reference to a preferred embodiment. However, it is conceivable for a person skilled at the art that modifications or changes can be made to the invention without leaving the scope of protection of the following claims.

The invention claimed is:

1. An independent wheel suspension (1) for a steerable wheel (37) of a vehicle having a steering column (17) which cooperates with a linear guide (5) movable in an approximately vertical direction (A) via a fork crown (7), wherein the fork crown (7) creates a steering connection to a vehicle frame (39) pivotable around an at least approximately vertically running axis of rotation (B) and wherein the linear guide (5) is coupled to a fluidic spring and/or damping element (9) which forms a load-bearing component of the fork crown(7); wherein the steering column extends through the fork crown and forms a portion of the damping element;
the portion of the damping element that is the steering column comprises a damping cylinder; and
the damping element (9) comprises one or a plurality of pressure reservoirs (11) with connections (13), wherein the pressure reservoirs (11) have a fluidic connection with the damping cylinder by way of line systems.

2. An independent wheel suspension according to claim 1 in which the fluidic spring and/or damping element (9) is arranged in the steering column (17) as an integrated component.

3. An independent wheel suspension according to claim 1 in which the linear guide (5) is equipped with a drive motor (3) for driving the steerable wheel (37).

4. An independent wheel suspension according to claim 1 in which the fork crown (7) comprises two linear guide elements (25) with two guide rods (23) running through it.

5. An independent wheel suspension according to claim 1 in which the steering column (17) is designed to transmit a torque to the fork crown (7).

6. An independent wheel suspension according to claim 1 in which the damping cylinder or the spring and/or damping element (9) comprises an air bellows (15) which has a spring-mounted connection with a prop (31) of a slide (5a).

7. An agricultural utility vehicle (35) having at least one independent wheel suspension (1) according to claim 1, a vehicle frame (39) which the at least one independent wheel suspension (1) is arranged on and at least one or a plurality of ground treatment or semi-mounted devices (41) attached on the vehicle frame.

\* \* \* \* \*